United States Patent
Lee

(10) Patent No.: US 9,518,680 B2
(45) Date of Patent: Dec. 13, 2016

(54) COMPRESSOR AND VALVE ASSEMBLY THEREOF FOR REDUCING PULSATION AND/OR NOISE

(71) Applicant: Dongbu Daewoo Electronics Corporation, Seoul (KR)

(72) Inventor: Won Woong Lee, Seoul (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 274 days.

(21) Appl. No.: 14/167,425

(22) Filed: Jan. 29, 2014

(65) Prior Publication Data
US 2015/0176580 A1 Jun. 25, 2015

(30) Foreign Application Priority Data
Dec. 24, 2013 (KR) .................. 10-2013-0162008

(51) Int. Cl.
F16K 47/08 (2006.01)
F04B 39/00 (2006.01)
F04B 39/10 (2006.01)

(52) U.S. Cl.
CPC .......... *F16K 47/08* (2013.01); *F04B 39/0055* (2013.01); *F04B 39/0061* (2013.01); *F04B 39/1066* (2013.01); *F04B 39/1073* (2013.01)

(58) Field of Classification Search
CPC .......... F16K 47/08; F16K 47/12; F16K 47/14; F16K 47/16; F04B 39/0055; F04B 39/0061; F04B 39/1066; F04B 39/1073; F04B 27/1804; F04B 7/02–7/0216; F04B 11/0091; F04B 53/001; F04B 53/1047

(Continued)

(56) References Cited

U.S. PATENT DOCUMENTS 5,722,818 A    3/1998   Ohta et al.
6,012,908 A *   1/2000   Tanaka ................ F04B 39/0055
                                                  417/312

(Continued)

FOREIGN PATENT DOCUMENTS

CN   101035985 A   9/2007
CN   102235338 A   11/2011

(Continued)

OTHER PUBLICATIONS

EPO, Extended European Search Report dated Oct. 26, 2015 issued in corresponding European Patent Application No. 14177226.9.

(Continued)

*Primary Examiner* — William H Rodriguez
*Assistant Examiner* — Christopher Brunjes

(57) ABSTRACT

A valve assembly may include a valve plate having an inlet hole through which working fluid passes from a vacuum muffler, a first discharge hole through which working fluid discharged from a cylinder passes, a second discharge hole through which the working fluid from the first discharge hole passes, and a pulsation and/or noise reducing passage through which the working fluid from the second discharge hole flows; a discharge valve at or in the valve plate configured to open and/or close the first discharge hole; a valve sheet having a first hole therein communicating with the first discharge hole and a second hole therein at an outlet of the pulsation and/or noise reducing passage; and a vacuum valve in the valve sheet configured to open and/or close the inlet hole.

14 Claims, 4 Drawing Sheets

(58) Field of Classification Search
USPC .............. 417/571, 312, 569, 559; 137/251.1, 137/513.3, 513.7
See application file for complete search history.

(56) References Cited

U.S. PATENT DOCUMENTS

| | | |
|---|---|---|
| 6,296,457 B1 | 10/2001 | Shintoku et al. |
| 2005/0106038 A1 | 5/2005 | Yoon et al. |
| 2006/0275150 A1 | 12/2006 | Barth |
| 2010/0209280 A1 | 8/2010 | Flannigan et al. |

FOREIGN PATENT DOCUMENTS

| | | |
|---|---|---|
| KR | 10-2007-0006261 | 1/2007 |
| KR | 10-2013-0129790 A | 11/2013 |
| WO | 2006038146 A1 | 4/2006 |

OTHER PUBLICATIONS

Yong Seok Lee, Compressor Mounted with Discharging Pulsation Damping Part, Abstract of 10-2013-0129790; Nov. 29, 2013; http://kpa.kipris.or.kr.

Chinese Office Action dated May 4, 2016 issued in corresponding Chinese Patent Application No. 201410048016.X and English translation thereof.

* cited by examiner

COMPRESSOR AND VALVE ASSEMBLY THEREOF FOR REDUCING PULSATION AND/OR NOISE

CROSS-REFERENCE TO RELATED APPLICATIONS

This application is based on and claims priority from Korean Patent Application No. 10-2013-0162008, filed on Dec. 24, 2013, the disclosure of which is incorporated herein in its entirety by reference.

TECHNICAL FIELD

The present disclosure relates to a compressor and a valve assembly thereof configured to reduce pulsation and/or noise (e.g., in a refrigerator).

BACKGROUND

There have been various compressors for use in a refrigerators (e.g., a reciprocating compressor, a rotary compressor, and a turbo compressor) that serve to circulate a compressed gas refrigerant within the refrigerator. The reciprocating compressor may compress the gas refrigerant through a reciprocating movement of a piston, while the rotary compressor may compress the gas refrigerant by rotating a rotator in a cylinder. Further, the turbo compressor may compress the gas refrigerant by converting velocity energy to pressure energy using the centrifugal force of an impeller.

While the compressor repeats a cycle of suction or vacuum, compression and discharge of the gas refrigerant according to the compression stroke of the piston, pulses (e.g., a pulsation) may be generated in the compressor. The pulsation of the gas refrigerant causes noise in the compressor. Therefore, to alleviating the noise, a discharge muffler that reduces a pressure variation is provided at a discharge passage of the compressor.

The discharge muffler may mitigate the gas pressure, thus reducing the noise by expanding the gas refrigerant or extending the flow path of the gas refrigerant.

Recently, there has been proposed a discharge muffler in which two discharge spaces are connected to each other. The discharge muffler may serve to reduce pulsation of the gas refrigerant by increasing the capacity of the muffler through the two discharge spaces.

However, the discharge muffler is installed in a limited space within the compressor, thereby making it difficult to increase the volume of the discharge spaces. This hinders pulsation reducing performance in the compressor.

Korean Patent Application Publication No. 10-2013-0129290 (published on Nov. 29, 2013) may disclose a conventional compressor.

SUMMARY

Embodiments of the present disclosure provide a compressor capable of reducing a pulsation component of working fluid and/or noise of the compressor, and a valve assembly configured to reduce the pulsation and/or noise.

According to an aspect of the present disclosure, a valve assembly of a compressor configured to reduce pulsation and/or noise may include a valve plate having an inlet hole through which working fluid passes from a vacuum muffler, a first discharge hole through which the working fluid from a cylinder passes, a second discharge hole through which the working fluid from the first discharge hole passes, and a passage (e.g., a pulsation and/or noise reducing passage) through which the working fluid from the second discharge hole flows; a discharge valve at the valve plate configured to open and close the first discharge hole; a valve sheet having a first hole communicating with the first discharge hole and a second hole at an outlet of the passage; and a vacuum valve in the valve sheet configured to open and close the inlet hole of the valve plate.

According to an aspect of the present disclosure, a compressor may include a vacuum muffler configured to supply working fluid; a cylinder block having a cylinder; a cylinder head coupled to the cylinder block to seal the cylinder, having a head groove through which the working fluid from the muffler flows; a valve assembly between the cylinder block and the cylinder head, including a valve plate configured to control a flow of the working fluid; and a discharge muffler supplied with the working fluid from the valve assembly.

According to embodiments of the present disclosure, a pulsation component of the working fluid may be reduced by increasing a flow distance or path of the working fluid through a passage (e.g., a pulsation and/or noise reducing passage) in a valve plate.

DETAILED DESCRIPTION

Figure 1:
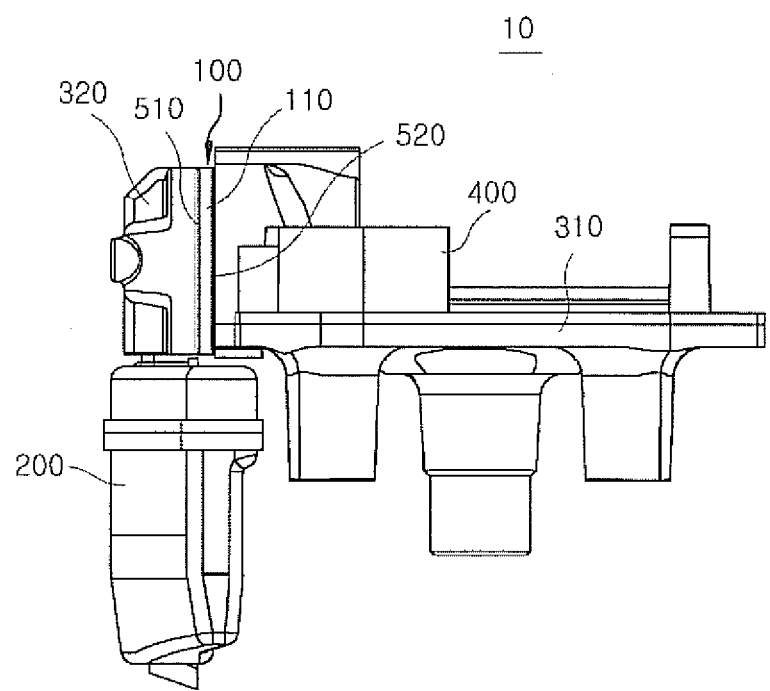
FIG. 1 is a side view of an exemplary compressor according to one or more embodiments of the present disclosure.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

One or more exemplary embodiments of the present disclosure will be described more fully hereinafter with reference to the accompanying drawings, in which one or more exemplary embodiments of the disclosure can be easily determined by those skilled in the art. As those skilled in the art will realize, the described embodiments may be modified in various different ways, all without departing from the spirit or scope of the present disclosure, which is not limited to the exemplary embodiments described herein.

It is noted that the drawings are schematic and are not necessarily dimensionally illustrated. Relative sizes and proportions of parts in the drawings may be exaggerated or reduced in their sizes, and a predetermined size is just exemplary and not limiting. The same reference numerals designate the same structures, elements, or parts illustrated in two or more drawings in order to exhibit the same or similar characteristics.

The disclosed embodiments of the present disclosure illustrate ideal embodiments of the present disclosure in more detail. As a result, various modifications of the drawings are expected. Accordingly, the exemplary embodiments are not limited to a specific form of the illustrated region, and for example, include a modification of a form by manufacturing.

Figure 2:
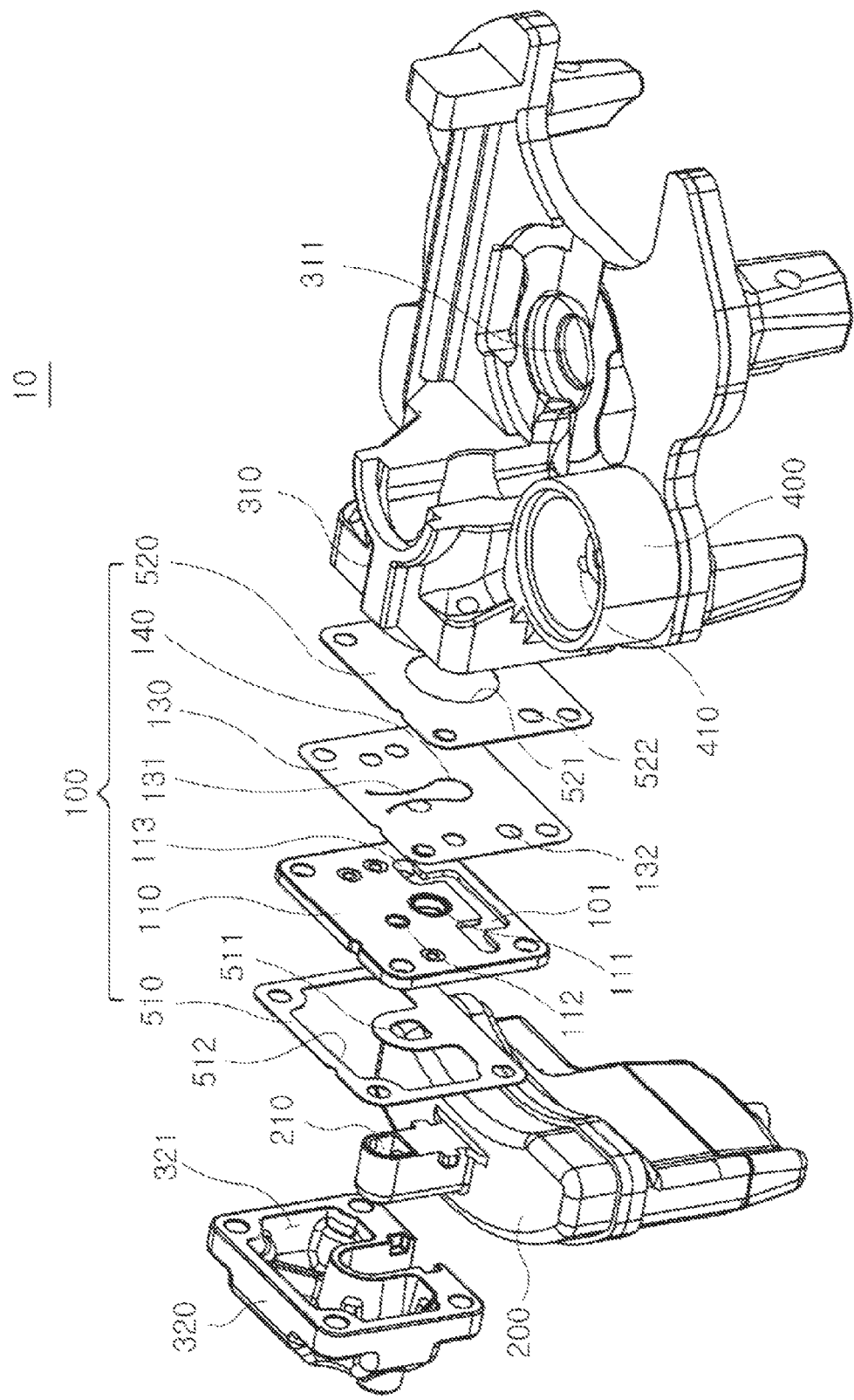
FIG. 2 is a disassembled perspective view of an exemplary compressor according to one or more embodiments of the present disclosure.

FIG. 1 is a side view of an exemplary compressor according to one or more embodiments of the present disclosure, and FIG. 2 is a disassembled perspective view of an exemplary compressor according to one or more embodiments of the present disclosure.

Referring to FIGS. 1 and 2, a compressor 10 according to embodiment(s) of the present disclosure may include a vacuum muffler 200, a cylinder block 310, a cylinder head 320, a discharge muffler 400, and a valve assembly 100.

The vacuum muffler 200 may provide working fluid from a pipe (e.g., a vacuum pipe; not illustrated) to a cylinder 311 of the cylinder block 310 through the valve assembly 100. Herein, the pipe may receive the working fluid from outside the compressor 10 and provide the received working fluid to the vacuum muffler 200.

A hole 210 may be at, in or to the vacuum muffler 200 that communicates with an inlet hole 111 of the valve assembly 100. The hole 210 may be also aligned with and/or inserted into a slot or opening in the cylinder head 320 (e.g., to facilitate alignment and/or communication with the inlet hole 111).

In various embodiments, the compressor 10 may be an enclosed reciprocating compressor employed in a refrigerator, and the working fluid may be a refrigerant used in generating cool air for the refrigerator. Also, the pipe may transfer the refrigerant from an evaporator to the vacuum muffler 200.

The cylinder block 310 may include the cylinder 311 in which a movable and/or reciprocating piston (not illustrated) is installed. The cylinder 311 may communicate with the vacuum muffler 200 and/or the discharge muffler 400 via the valve assembly 100.

That is, when the piston moves from a top dead center to a bottom dead center of the cylinder 311, an inner pressure of the cylinder 311 becomes negative (e.g., under vacuum), and the working fluid inside the vacuum muffler 200 may enter the cylinder 311 via the valve assembly 100. When the piston moves from the bottom dead center to the top dead center of the cylinder 311, the pressure of the cylinder 311 becomes positive (e.g., greater than atmospheric pressure), and the working fluid inside the cylinder 311 may be discharged to the discharge muffler 400 via the valve assembly 100.

Herein, the top dead center may be a point where the piston is at an upper limit of the cylinder 311, and the bottom dead center may be a point where the piston is at a lower limit of the cylinder 311.

The cylinder head 320 may be coupled to the cylinder block 310 to seal the cylinder 311. The cylinder head 320 may have a head groove 321 into which the working fluid flows. In more detail, the working fluid discharged from the cylinder 311 may flow into the head groove 321.

Further, the cylinder block 310 may include the discharge muffler 400. The discharge muffler 400 may be designed to have a cylindrical shape to reduce noise and pulsation of the working fluid. The discharge muffler 400 may be supplied with the working fluid of the cylinder 311 through the valve assembly 100. The discharge muffler 400 may be have a discharge (or entrance) hole 410 through which the working fluid of the valve assembly 100 enters (or is discharged).

The valve assembly 100 according to one or more embodiments of the present disclosure may be between the cylinder block 310 and the cylinder head 320 and may be configured to control the flow of the working fluid by a pressure difference between the cylinder 311 and the vacuum muffler or the discharge muffler. The valve assembly 100 may include a valve plate 110, a discharge valve 120 (see FIGS. 4 and 5), a valve sheet 130, a vacuum valve 140, a discharge gasket 510, and a vacuum gasket 520.

Figure 3:
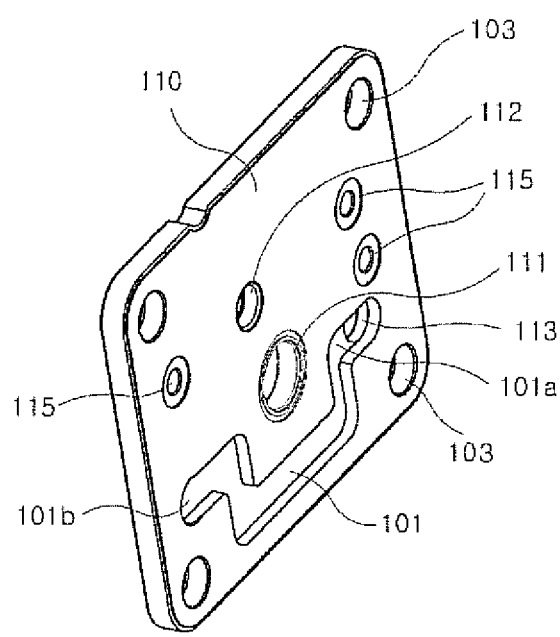
FIG. 3 is a perspective view of an exemplary valve plate for a pulsation and/or noise reducing valve assembly according to an embodiment of the present disclosure.
Figure 4:
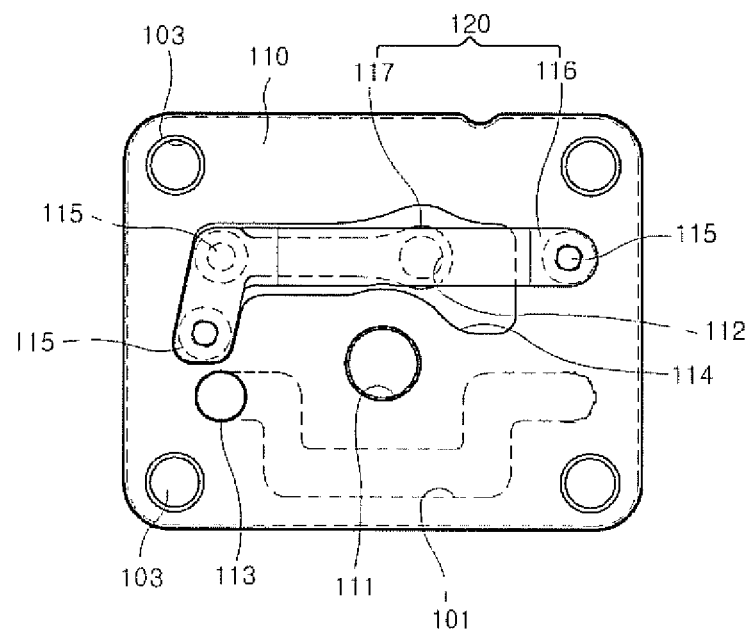
FIG. 4 is a rear view of an exemplary valve plate for a pulsation and/or noise reducing valve assembly according to one or more embodiments of the present disclosure.
Figure 5:
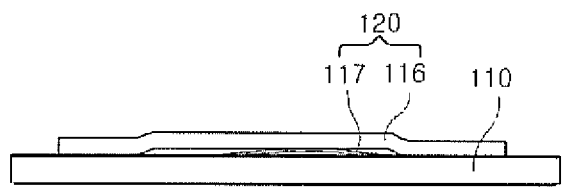
FIG. 5 is a plan view of an exemplary valve plate in a pulsation and/or noise reducing valve assembly according to an embodiment of the present disclosure.

FIG. 3 is a perspective view of an exemplary valve plate in a pulsation and/or noise reducing valve assembly according to embodiment(s) of the present disclosure, FIG. 4 is a rear view of an exemplary valve plate in a pulsation and/or noise reducing valve assembly according to embodiment(s) of the present disclosure, and FIG. 5 is a plan view of an exemplary valve plate in a pulsation and/or noise reducing valve assembly according to embodiment(s) of the present disclosure.

As illustrated in FIG. 2, the valve plate 110 may be between the discharge gasket 510 and the valve sheet 130. Referring to FIGS. 3 through 5, the valve plate 110 has an inlet hole 111, a first discharge hole 112, a second discharge hole 113, one or more coupling holes 103, and one or more fixing holes 115. Further, the valve plate 110 includes a pulsation and/or noise reducing passage 101 which may be in one surface of (but not entirely through) the valve plate 110, and a mounting groove or slot 114 which may be in another (e.g., opposite) surface of the valve plate 110. Assembled to the mounting groove 114 is the discharge valve 120.

The inlet hole 111 communicates with the hole 210 (e.g., a vacuum hole) such that the working fluid of the vacuum muffler 200 flows through the inlet hole 111. The first discharge hole 112 of the valve plate 110 communicates with the head groove 321, and the working fluid discharged from the cylinder 311 may pass through the first discharge hole 112. The working fluid in the head groove 321 may pass through the second discharge hole 113. A bolt (not illustrated) for assembling the valve plate 110 to the valve assembly 100 may be inserted into the coupling hole(s) 103. A pin (not illustrated) for coupling the discharge valve 120 to the valve plate 110 may be inserted into the fixing hole(s) 115.

The pulsation and/or noise reducing passage 101 comprises an elongated groove or slot in one surface of the valve plate 110 to provide a flow path for the working fluid in the space between the valve plate 110 and the valve sheet 130. In this regard, the valve plate 110 and the valve sheet 130 are assembled to contact each other and form a gas-tight seal therebetween. An entrance 101a of the pulsation and/or noise reducing passage 101 is in communication with the second discharge hole 113, while an exit 101b of the pulsation and/or noise reducing passage 101 is associated with the valve sheet 130 as described hereinafter. In various embodiments, the pulsation and/or noise reducing passage 101 may have a "U" or "C" shape that surrounds or bypasses part or substantially all of a periphery of the inlet hole 111, the length, cross-sectional area and shape of the pulsation and/or noise reducing passage 101 may be adjusted in accordance with pulsation characteristics of the compressor 10. In one embodiment, the passage 101 extends over as much area as possible on the side of the valve plate 110 not occupied by a hole 111, 112, 113 or 115 or an area around such holes that would otherwise weaken a structure in the valve plate 110.

The elongation of the pulsation and/or noise reducing passage 101 enables the flow length of the working fluid to extend in the valve plate 110, thereby reducing the flow velocity of the working fluid. This results in the alleviation of noise and/or vibration of the compressor 10. Particularly, since the pulsation and/or noise reducing passage 101 may reduce the pulsation and/or noise generated during the operation of the compressor 10, the pulsation and/or noise reducing passage 101 may minimize the capacity and/or increase the efficiency of the discharge muffler 400 compared with the existing discharge muffler, thereby decreasing the overall size of the compressor 10 or reducing the noise from a same-sized compressor.

The discharge valve 120 may open and close the first discharge hole 112 by the pressure difference of the cylinder 311 (e.g., between the cylinder 311 and the cylinder head groove 321). The discharge valve 120 may include a discharge piece or section 117 which selectively opens or closes the first discharge hole 112, and a support piece or section 116 which supports the discharge piece or section 117. One end of the discharge piece or section 117 is secured to a fixing hole 115 in the valve plate 110, while another end of the discharge piece or section 117 may be on or over the first discharge hole 112. The support piece(s) or section(s) 116 may be secured to one or more additional fixing holes 115 in the valve plate 110.

The valve sheet 130 may be between the vacuum gasket 520 and the valve plate 110. A first hole 131 and a second hole 132 may be in the valve sheet 130. The first hole 131 of the valve sheet 130 communicates with the first discharge hole 112 of the valve plate 110. The second hole 132 of the valve sheet 130 is at an exit of the pulsation and/or noise reducing passage 101, and may communicate with the exit 101b of the pulsation and/or noise reducing passage 101.

The vacuum valve 140 of the valve sheet 130 may be formed or made by cutting away (e.g., routing) a groove, slot or pathway in the valve sheet 130. The vacuum valve 140 may open and close the inlet hole 111 of the valve plate 110 by the pressure difference of the cylinder 311 (e.g., between the cylinder 311 and the vacuum muffler 200).

The discharge gasket 510 may be between the cylinder head 320 and the valve plate 110. A first discharge gasket hole 511 and a second discharge gasket hole 512 may be in the discharge gasket 510. The first discharge gasket hole 511 communicates with the inlet hole 111 of the valve plate 110, the second discharge gasket hole 512 is communication with the first discharge hole 112 and the second discharge hole 113 of the valve plate 110.

The vacuum gasket 520 may be between the cylinder block 310 and the valve sheet 130. A first vacuum gasket hole 521 and a second vacuum gasket hole 522 may be in the vacuum gasket 520. The first vacuum gasket hole 521 communicates with the first hole 131 of the valve sheet 130, while the second vacuum gasket hole 522 communicates with the second hole 132 of the valve sheet 130.

Operations of the compressor 10 according to embodiments having the above configuration(s) will be described.

When the piston moves from the top dead center to the bottom dead center of the cylinder 311, the working fluid of the vacuum muffler 200 may be pulled into the cylinder 311 via the valve assembly 100.

In detail, the working fluid in the vacuum muffler 200 may be pulled into the cylinder 311 by the negative pressure in the cylinder 311. At this time, the inlet hole 111 of the valve plate 110 may be opened by the vacuum valve 140. When the inlet hole 111 is opened, the working fluid of the vacuum muffler 200 passes through the hole 210, the first discharge gasket hole 511, the inlet hole 111, and the first vacuum gasket hole 521, and then may enters the cylinder 311.

When the piston moves from the bottom dead center to the top dead center of the cylinder 311, the working fluid of the cylinder 311 may be discharged to the discharge muffler 400 via the valve assembly 100.

In detail, the working fluid of the cylinder 311 may be discharged in the direction of the cylinder head 320 by the positive pressure formed inside the cylinder 311. At this time, the first discharge hole 112 of the valve plate 110 may be opened by the discharge piece 117 of the discharge valve 120. When the first discharge hole 112 of the valve plate 110 is opened, the working fluid of the cylinder 311 may move through the first vacuum gasket hole 521, the first hole 131, the first discharge hole 112, the second discharge gasket hole 512 and the head groove 321, thereafter pass through the second discharge gasket hole 512, the second discharge hole 113, the pulsation and/or noise reducing passage 101, the second hole 132, the second vacuum gasket hole 522 and the discharge hole 410, and then be discharged to the discharge muffler 400.

Compared with the flow of the working fluid in the existing art, since the pulsation and/or noise reducing passage 101 is at or in the valve plate 110, the traveling distance of the working fluid may increase. Lengthening the time of circulation of the working fluid results in a reduction of the velocity of the working fluid discharged to the discharge muffler 400. Therefore, noise and/or vibrations due to the pulsation of the working fluid may be minimized.

Particularly, the pulsation and/or noise reducing passage 101 may have a "U," "C," or other shape and be shielded by the valve sheet 130. Thus, the working fluid from the head groove 321 can flow along a curved or substantially bent groove or pathway in the pulsation reducing passage 101 (e.g., having an angle of about 90 degrees) around and/or from the entrance 101a of the pulsation and/or noise reducing passage 101, and along a substantially curved or bent groove or pathway of the pulsation and/or noise reducing passage 101 (e.g., having one or more arcs of 90 degrees or more) around and/or towards the exit 101b of the pulsation and/or noise reducing passage 101, and then through the second hole 132. That is, since the working fluid can flow along the curved groove or pathway of the pulsation and/or noise reducing passage 101 while traveling from the cylinder head 320 to the discharge muffler 400, the velocity of the working fluid may be reduced, and thus, the noise and/or the vibration may be significantly decreased.

Although exemplary embodiments of the present disclosure are described above with reference to the accompanying drawings, those skilled in the art will understand that the present disclosure may be implemented in various ways without changing the necessary features or the spirit of the present disclosure.

Therefore, it should be understood that the exemplary embodiments described above are not limiting, but only an example in all respects. The scope of the present disclosure is expressed by claims below, not the detailed description, and it should be construed that all changes and modifications achieved from the meanings and scope of claims and equivalent concepts are included in the scope of the present disclosure.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure do not limit the present disclosure. The scope of the present disclosure will be interpreted by the claims below, and it will be construed that all techniques within the scope equivalent thereto belong to the scope of the present disclosure.

What is claimed is:

1. A valve assembly, comprising:
   a valve plate having an inlet hole through which working fluid passes, a first discharge hole through which the working fluid passes, a second discharge hole through which the working fluid from the first discharge hole passes, and a passage extending to or surrounds at least a part of a periphery of the inlet hole, which the working fluid from the second discharge hole flows;
   a discharge valve at or in the valve plate configured to open and/or close the first discharge hole; a valve sheet having a first hole communicating with the first discharge hole and a second hole at an outlet of the passage; and
   a vacuum valve in the valve sheet configured to open and/or close the inlet hole of the valve plate.

2. The valve assembly of claim 1, further comprising:
   a discharge gasket in contact with the valve plate and having a first discharge gasket hole communicating with the inlet hole, and a second discharge gasket hole communicating with the first and the second discharge holes of the valve plate; and
   a vacuum gasket in contact with the valve sheet and having a first vacuum gasket hole communicating with the first hole and a second vacuum gasket hole communicating with the second hole.

3. The valve assembly of claim 2, wherein the passage is in one surface of the valve plate.

4. The valve assembly of claim 3, wherein the passage has a "U" or "C" shape, or a combination thereof with one or more other shapes.

5. The valve assembly of claim 2, wherein the passage is shielded or covered by the valve sheet, and an exit side of the passage communicates with the second hole.

6. The valve assembly of claim 1, further comprising a vacuum muffler that provides the working fluid to the valve plate.

7. The valve assembly of claim 1, further comprising a cylinder that provides the working fluid to the first discharge hole.

8. A compressor, comprising the valve assembly of claim 1.

9. A compressor comprising:
   a vacuum muffler configured to supply working fluid;
   a cylinder block having a cylinder therein;
   a cylinder head coupled to the cylinder block to seal the cylinder, having a head groove through which the working fluid flows;
   a valve assembly between the cylinder block and the cylinder head, including a valve plate configured to control the flow of the working fluid therein; and
   a discharge muffler supplied with the working fluid from the valve assembly wherein the valve plate comprises an inlet hole through which working fluid passes from the vacuum muffler, a first discharge hole through which the working fluid from the cylinder passes, a second discharge hole through which the working fluid from the first discharge hole passes and a passage extending to or surrounds at least a part of a periphery of the inlet hole through which the working fluid from the second discharge hole flows.

10. The compressor of claim 9, wherein the passage is in one surface of the valve plate.

11. The compressor of claim 10, wherein the passage has a "U" shape or "C" shape, or a combination thereof with one or more other shapes.

12. The compressor of claim 9, wherein the valve assembly comprises:
    a discharge valve coupled to on in the valve plate configured to open and/or close the first discharge hole;
    a valve sheet having a first hole communicating with the first discharge hole and a second hole at an outlet of the passage; and
    a vacuum valve in the valve sheet configured to open and/or close the inlet hole.

13. The compressor of claim 9, wherein the valve assembly comprises:
    a discharge gasket between the cylinder head and the valve plate, having a first discharge gasket hole communicating with the inlet hole, and a second discharge gasket hole communicating with the first and the second discharge holes of the valve plate; and
    a vacuum gasket between the cylinder block and the valve sheet, having a first vacuum gasket hole communicating with the first hole and a second vacuum gasket hole communicating with the second hole.

14. A refrigerator, comprising the compressor of claim 9.

* * * * *